(12) United States Patent
Sasaki et al.

(10) Patent No.: US 10,967,717 B2
(45) Date of Patent: Apr. 6, 2021

(54) DOOR STRUCTURE

(71) Applicant: HONDA MOTOR CO., LTD., Tokyo (JP)

(72) Inventors: Yasuhiro Sasaki, Wako (JP); Yoichi Katayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 16/342,369

(22) PCT Filed: Aug. 25, 2017

(86) PCT No.: PCT/JP2017/030586
§ 371 (c)(1),
(2) Date: Apr. 16, 2019

(87) PCT Pub. No.: WO2018/074062
PCT Pub. Date: Apr. 26, 2018

(65) Prior Publication Data
US 2019/0283558 A1    Sep. 19, 2019

(30) Foreign Application Priority Data

Oct. 18, 2016  (JP) .............................. JP2016-204151

(51) Int. Cl.
*B60J 10/22*      (2016.01)
*B60J 10/36*      (2016.01)
(Continued)

(52) U.S. Cl.
CPC .............. *B60J 10/22* (2016.02); *B60J 10/20* (2016.02); *B60J 10/36* (2016.02); *B60J 10/50* (2016.02); *B60J 10/86* (2016.02); *B60R 13/043* (2013.01)

(58) Field of Classification Search
CPC ..................................................... B60J 5/0415
See application file for complete search history.

(56) References Cited

U.S. PATENT DOCUMENTS 4,196,929 A * 4/1980 Bauer .................... B60J 5/0412
296/146.5
5,446,999 A * 9/1995 Inaba ..................... B60J 5/0415
296/146.5
(Continued)

FOREIGN PATENT DOCUMENTS

JP   2006-193094 A    7/2006
JP   2007-055516 A    3/2007
(Continued)

OTHER PUBLICATIONS

Indian Office Action received in corresponding Indian application No. 201947019633 dated Jan. 23, 2020, English translation included, 4 pages.

(Continued)

*Primary Examiner* — Catherine A Kelly
(74) *Attorney, Agent, or Firm* — Rankin, Hill & Clark LLP

(57) ABSTRACT

Provided is a door structure including: a door installed capable of opening and closing a door opening part of a vehicle body; a decorative member attached to a surface of the door which faces an outside of a vehicle; and a sealing member arranged along an end part of the door which faces an outside of the door, and sealing the door opening part, wherein the sealing member includes a thick part which becomes thicker toward an inside of the door, and which is inserted into a gap formed between the end part of the door which faces the outside of the door and an end part of the decorative member which faces the outside of the door, and the sealing member is biased toward an inside of the vehicle.

6 Claims, 5 Drawing Sheets

(51) Int. Cl.
*B60J 10/50* (2016.01)
*B60J 10/86* (2016.01)
*B60R 13/04* (2006.01)
*B60J 10/20* (2016.01)

(56) References Cited

U.S. PATENT DOCUMENTS

| | | | | |
|---|---|---|---|---|
| 6,138,415 | A * | 10/2000 | Ohtsu | B60R 13/04 |
| | | | | 296/146.9 |
| 6,186,579 | B1 * | 2/2001 | Fussnegger | B60J 5/0469 |
| | | | | 296/146.1 |
| 9,168,813 | B2 * | 10/2015 | Kasuya | E06B 7/14 |
| 9,216,634 | B1 * | 12/2015 | Meinburg | B60J 10/24 |
| 10,065,488 | B2 * | 9/2018 | Halliwell | B60R 13/0815 |
| 10,457,224 | B2 * | 10/2019 | Katayama | B60R 13/04 |
| 10,532,644 | B2 * | 1/2020 | Katayama | B60J 10/86 |
| 2006/0230686 | A1 * | 10/2006 | Plum | B60J 10/45 |
| | | | | 49/498.1 |
| 2008/0122250 | A1 * | 5/2008 | Lichter | B60J 10/87 |
| | | | | 296/146.9 |
| 2011/0012388 | A1 * | 1/2011 | Iida | B60R 13/04 |
| | | | | 296/146.9 |
| 2012/0267914 | A1 * | 10/2012 | Thiele | E05F 15/44 |
| | | | | 296/146.9 |
| 2014/0049067 | A1 * | 2/2014 | Kasuya | B60J 10/86 |
| | | | | 296/146.5 |

FOREIGN PATENT DOCUMENTS

| | | |
|---|---|---|
| JP | 2009-078658 A | 4/2009 |
| JP | 2012-218653 A | 11/2012 |
| JP | 2015-063199 A | 4/2015 |

OTHER PUBLICATIONS

International Search Report by ISA/JP dated Oct. 24, 2017, on PCT/JP2017/030586 (3 pages).

Written Opinion by ISA/JP dated Oct. 24, 2017, on PCT/JP2017/030586 (3 pages).

* cited by examiner

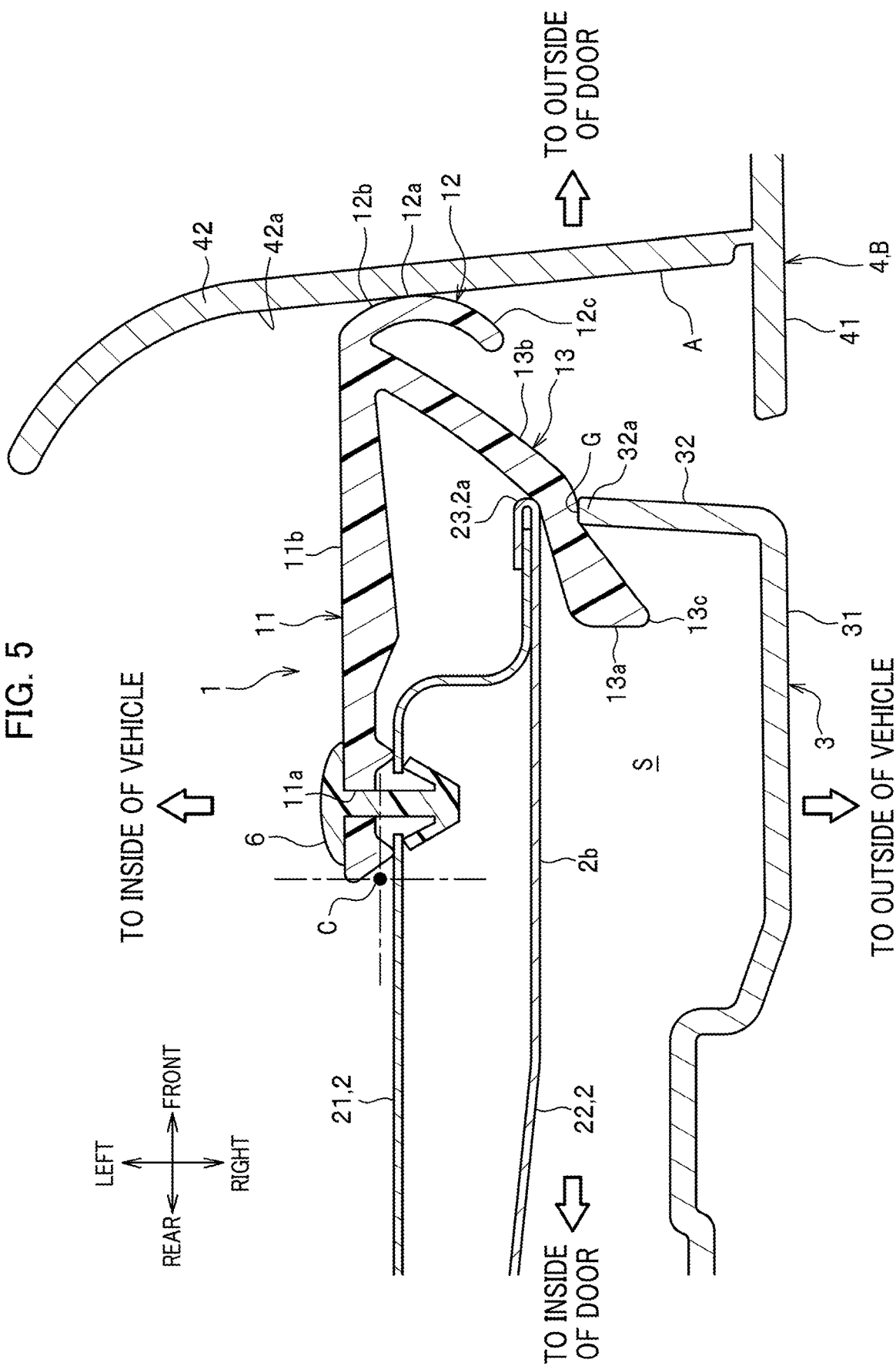

DOOR STRUCTURE

TECHNICAL FIELD

The present invention relates to a door structure of a vehicle.

BACKGROUND ART

In general, a door of an automobile is provided with a sealing member which gets into elastic contact with an opening edge of a door opening part formed in a vehicle body to securely seal the gap between the door and the vehicle body.

Furthermore, a decorative member for enhancing a design quality, such as a garnish or a light mall, is attached to a surface of the door which faces the outside of the vehicle, and a gap is inevitably formed between an end part of the door which faces the outside of the door and an end part of the decorative member which faces the outside of the door. The existence of the gap like this causes wind noise. With this taken into consideration, many types of sealing members concurrently having a function of sealing the gap have been developed.

For example, Patent Literature 1 discloses a door structure in which a sealing member including an insertion part to be inserted into a gap is attached to a peripheral end of a door frame.

Moreover, for example, a method in which the decorative member is put closer to the door frame to be thus in contact with the sealing member is conceivable as means for easily sealing the gap without revamping the shape of the sealing member.

CITATION LIST

Patent Literature

Patent Literature 1: JP 2009-78658 A

SUMMARY OF INVENTION

Technical Problem

The door structure disclosed in Patent Literature 1, however, cannot completely seal the gap since the thickness of the insertion part is less than the width of the gap.

In addition, the method in which the decorative member is put closer to the door frame to be thus in contact with the sealing member cannot prevent the occurrence of the wind noise, since when the decorative member thermally elongates, a gap eventually occurs between the door and the decorative member.

In view of this, the door structure disclosed in Patent Literature 1 inhibits the gap from causing the wind noise by use of a sub-lip which is formed on the sealing member, and which gets into elastic contact with the decorative member in a place which is closer to the outside of the door than the gap is. The forming of the sub-lip, however, causes another problem of complicating the shape of the sealing member.

The present invention has been made from the above viewpoint. An object of the present invention is to provide a door structure which is capable of preventing a gap from causing wind noise with a simple structure.

Solution to Problem

To solve the above problems, the present invention is a door structure which includes: a door installed capable of opening and closing a door opening part of a vehicle body; a decorative member attached to a surface of the door which faces an outside of a vehicle; and a sealing member arranged along an end part of the door which faces an outside of the door, and sealing the door opening part. The door structure is characterized in that: the sealing member includes a thick part which is inserted into a gap formed between the end part of the door which faces the outside of the door and an end part of the decorative member which faces the outside of the door, and which becomes thicker toward an inside of the door; and the sealing member is biased toward the inside of the vehicle.

Advantageous Effects of Invention

The door structure according to the present invention is capable of preventing the gap from causing wind noise with the simple structure.

BRIEF DESCRIPTION OF DRAWINGS

FIG. 4A shows how the thick part works when the door lower garnish thermally elongates; and FIG. 4B shows how the thick part works when the door lower garnish thermally contracts; and FIG. 5 is a cross-sectional view showing a sealing member according to a modification.

DESCRIPTION OF EMBODIMENTS

Hereinafter, embodiments of the present invention will be described in detail with reference to the accompanying drawings depending on the necessity. "Front-rear," "upper-lower" and "left-right" indicated with arrows as appropriate in each drawing represent a front-rear direction and a top-bottom direction of a vehicle, as well as a left-right direction (vehicle width direction) viewed from a driver's seat, respectively. A vehicle inside-outside direction agrees with the left-right direction and the vehicle width direction. A side which is closer to a vehicle compartment than a door is will be referred to as an "inside of the vehicle," while a side opposite from the side which is closer to the vehicle compartment than the door is will be referred to as an "outside of the vehicle." In addition, a direction toward the center of the door in an in-plane direction of the door will be referred to as an "inside of the door," while a direction away from the center of the door in the in-plane direction of the door will be referred to as an "outside of the door." Furthermore, positional relationships among components will be hereinbelow described with the position of the closed door used as a reference.

Figure 1:
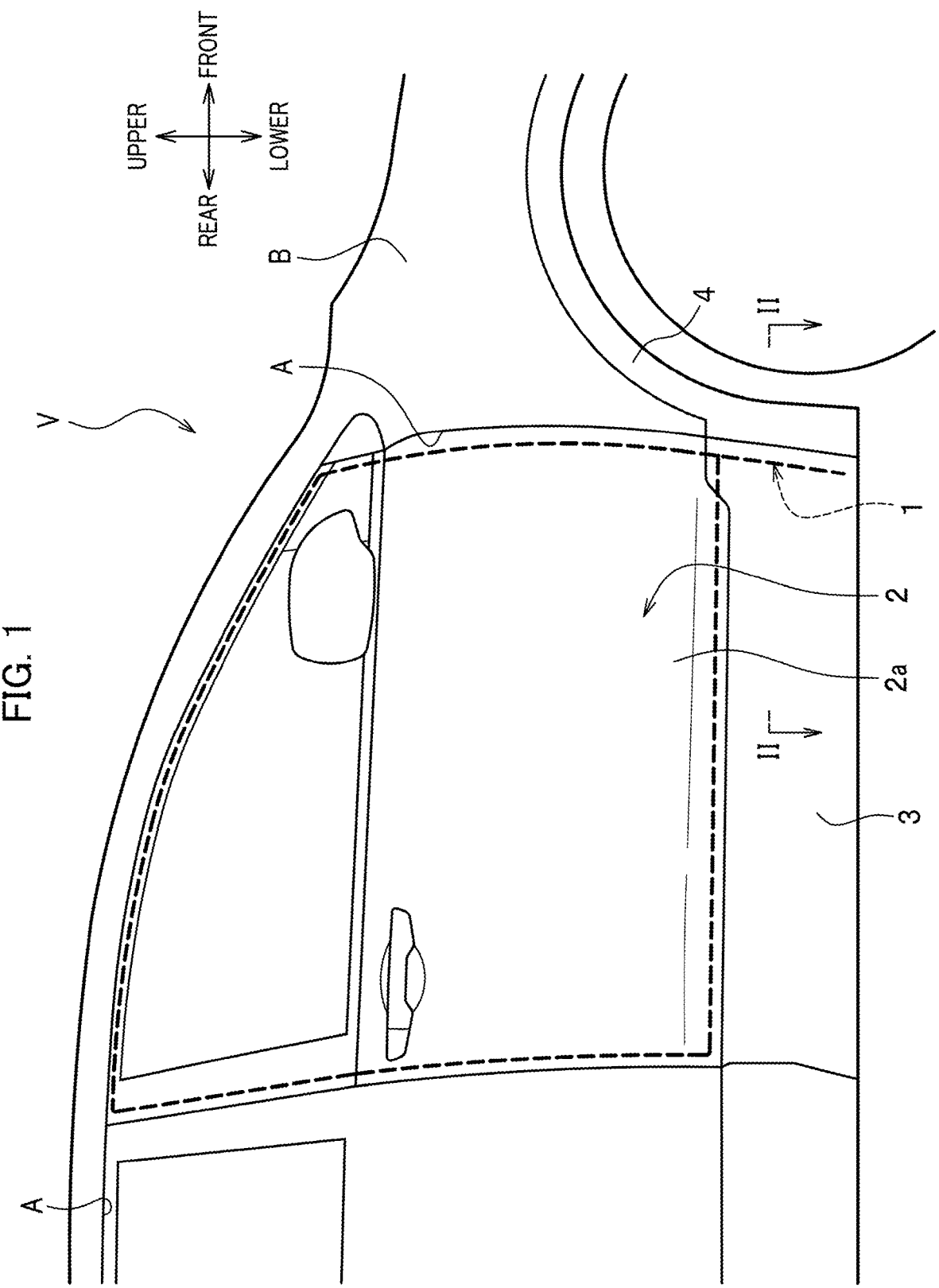
FIG. 1 is a side view of a vehicle including a door structure according to an embodiment.

As shown in FIG. 1, a vehicle body B of an automobile V as a vehicle includes multiple door opening parts A through which the occupant(s) gets into or out of an automobile V, and which are formed in each side of the vehicle body. A front door 2 is openably and closably installed in a front one of the door opening parts A. A door lower garnish 3 serving as a decorative member is attached to a lower end portion of a surface 2b of the front door 2 which faces the outside of the vehicle. In its side view, the door lower garnish 3 is formed in a substantially rectangular plate shape which is long in the front-rear direction. A wheel arch garnish 4 which constitutes a part of the vehicle body B is arranged in front of the door lower garnish 3. In its side view, the wheel arch garnish 4 is formed in a substantially semi-circular plate shape which curves convexly upward. A sealing member 1 which seals the gap between the door opening part A and the front door 2 is attached to a peripheral edge of the front door 2.

Figure 2:
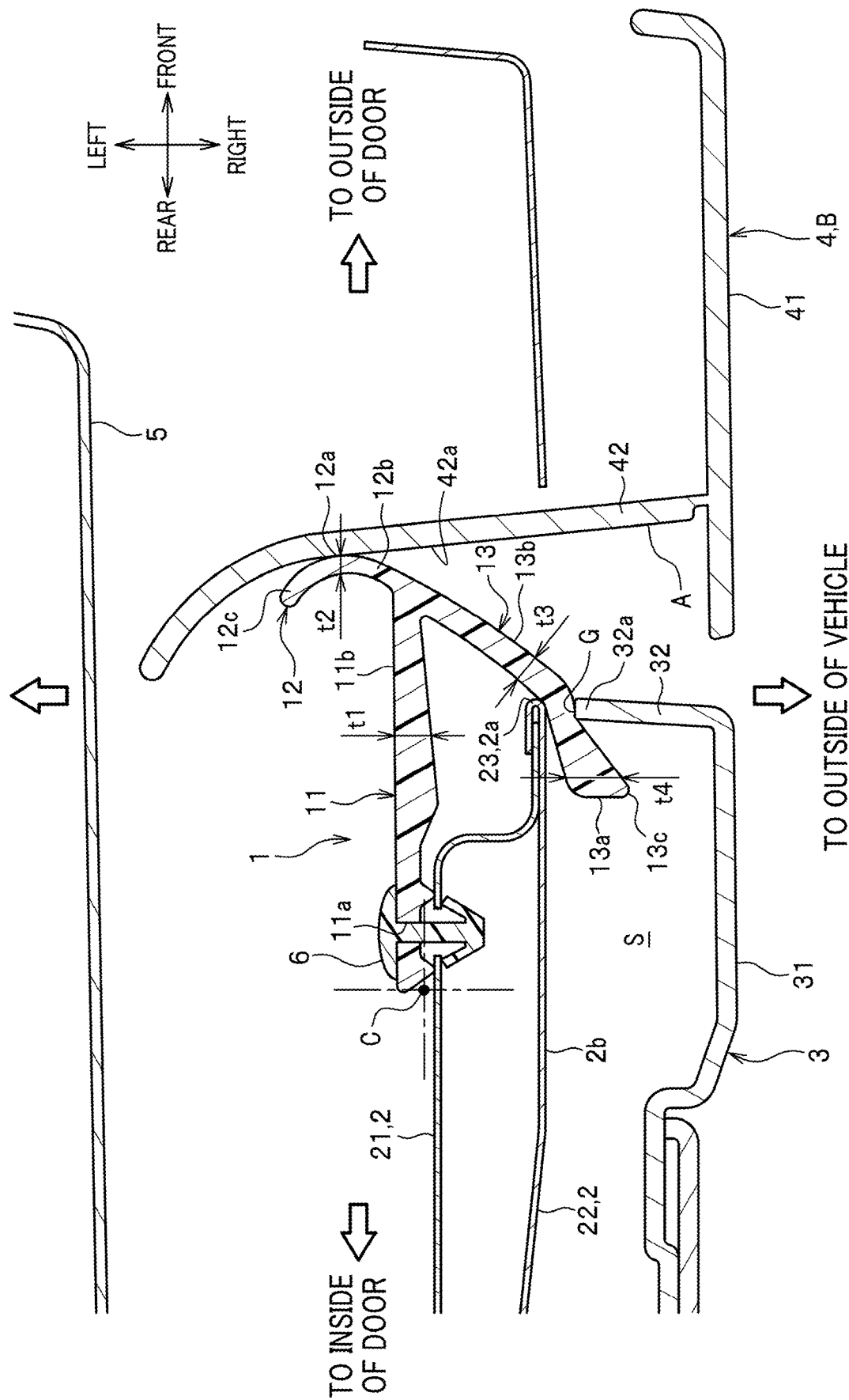
FIG. 2 is a cross-sectional view taken along the II-II line in FIG. 1.

The front door 2 is installed turnable around its end (its front end in the embodiment) to and from the vehicle body B. As shown in FIG. 2, the front door 2 includes a door inner panel 21 arranged inside the vehicle, and a door outer panel 22 arranged outside the vehicle. Incidentally, in FIG. 2, reference sign C denotes a schematically drawn "turn center" of the front door 2.

In the embodiment, the door inner panel 21 and the door outer panel 22 are metal-made, and are joined together by a hemming processed part 23. In the embodiment, the hemming processed part 23 joins the end portions of the respective door inner and outer panels 21, 22 which face the outside of the door. In the following descriptions, the hemming processed part 23 will be referred to as an "end part 2a facing the outside of the door" from time to time. In the embodiment, the turn center C is located closer to the inside of the door and closer to the inside of the vehicle than the end part 2a facing the outside of the door is. A front pillar 5 is arranged closer to the inside of the vehicle than the front door 2 is.

The door lower garnish 3 is a resin-made member which covers the lower end portion of the front door 2 from the outside of the vehicle. The door lower garnish 3 includes: a door lower design side part 31 constituting an outer surface of the door lower garnish 3; and a door lower flange part 32 constituting an end portion of the door lower garnish 3 which faces the outside of the door.

The door lower design side part 31 extends in the front-rear direction and in the upper-lower direction. The door lower design side part 31 crosses (in the embodiment, is substantially orthogonal to) the door lower flange part 32. The door lower design side part 31 is away from the door outer panel 22 toward the outside of the vehicle. Thereby, a space S having a predetermined width in the vehicle width direction is formed between the door lower design side part 31 and the door outer panel 22. Although not illustrated, the door lower design side part 31 includes a joining portion extending toward the inside of the vehicle, specifically toward the door outer panel 22, and is fixed to the door outer panel 22 with the assistance of the joining portion.

The door lower flange part 32 extends toward the inside of the vehicle from an end portion of the door lower design side part 31 which faces the outside of the door. An end part 32a of the door lower flange part 32 which faces the inside of the vehicle and the end part 2a of the front door 2 which faces the outside of the door are arranged in their respective positions which coincide with each other in the vehicle inside-outside direction. The end part 32a of the door lower flange part 32 which faces the inside of the vehicle is away toward the outside of the vehicle from the end part 2a of the front door 2 which faces the outside of the door. Thereby, a gap G having a predetermined width in the vehicle width direction is formed between the end part 2a of the front door 2 which faces the outside of the door and the end part 32a of the door lower flange part 32 which faces the inside of the vehicle.

The wheel arch garnish 4 is a metal-made member constituting a portion of the vehicle body B. The wheel arch garnish 4 includes: a wheel arch design side part 41 constituting an outer surface of the wheel arch garnish 4; and a wheel arch flange part 42 constituting a portion of the door opening part A.

The wheel arch design side part 41 extends in the front-rear direction and in the upper-lower direction. The wheel arch design side part 41 crosses (in the embodiment, is substantially orthogonal to) the wheel arch flange part 42. The wheel arch design side part 41 is away toward the outside of the door from the door lower garnish 3.

The wheel arch flange part 42 extends toward the inside of the vehicle from a position on the wheel arch design side part 41 which is near the front door 2. The wheel arch flange part 42 inclines becoming closer to the front door 2 toward the inside of the vehicle, and thereafter extends bending toward the front door 2. An end portion of the wheel arch flange part 42 which faces the inside of the vehicle reaches the vicinity of a surface of the front pillar 5 which faces the outside of the vehicle.

As shown in FIG. 1, the sealing member 1 is a member which seals mainly the door opening part A. As a whole, the sealing member 1 is formed in a substantially circular shape. A part of the sealing member 1 which corresponds to the door lower garnish 3 has a structure shown in FIG. 2. The sealing member 1 includes: a base part 11; a seal lip part 12 extending toward the inside of the vehicle from an end portion of the base part 11 which faces the outside of the door; and a sealing part 13 extending toward the outside of the vehicle from the end portion of the base part 11 which faces the outside of the door. The sealing member 1 is arranged on the end part 2a of the front door 2 which faces the outside of the door.

The base part 11 is a part extending in the front-rear direction and in the upper-lower direction. In its cross-sectional view, the base part 11 is formed in a straight plate shape. The base part 11 is arranged closer to the inside the vehicle than the end part 2a of the front door 2 which faces the outside of the door is. An attachment part 11a, which is a through-hole, is formed in a position on the base part 11 near the inside of the door. The attachment part 11a is a part attached to the front door 2 from the inside of the door. A clip 6 is provided penetrating through the attachment part 11a in the vehicle inside-outside direction. The attachment part 11a is fixed to the door inner panel 21 using the clip 6. The attachment part 11a is arranged in a position which substantially coincides with the turn center C. The attachment part 11a is located closer to the inside of the vehicle and closer to the inside the door than the gap G is. To put it the other way round, the gap G is located closer to the outside of the vehicle and closer to the outside of the door than the attachment part 11a is.

A plate-shaped part 11b joining the attachment part 11a and the sealing part 13 (thick part 13a) is formed in a portion of the base part 11 which is located closer to the outside of the door than the attachment part 11a is. In its cross-sectional view, the plate-shaped part 11b is formed in a straight plate shape. The plate-shaped part 11b plays a function of enhancing the rigidity of the attachment part 11a and the rigidity of all the seal lip part 12 including the thick part 13a. An end portion of the plate-shaped part 11b which faces the outside of the door is located closer to the outside of the door than the end part 2a of the front door 2 which faces the outside of the door.

The seal lip part 12 is a part which gets into elastic contact with the wheel arch flange part 42 to seal the gap between the door opening part A and the wheel arch flange part 42. In its cross-sectional view, the seal lip part 12 is formed in an arc shape which curves convexly toward the outside of the door. The seal lip part 12 extends toward the inside of the vehicle from the end portion of the base part 11 which faces the outside of the vehicle, and thereafter extends bending toward the inside of the door. The seal lip part 12 is arranged closer to the inside of the vehicle and closer to the outside of the door than the end part 2*a* of the front door 2 which faces the outside of the door is. The seal lip part 12 is formed such that its thickness dimension t2 is smaller than a thickness dimension t1 of the base part 11.

The seal lip part 12 includes: an elastic contact part 12*a* which gets into elastic contact with a surface 42*a* of the wheel arch flange part 42 which faces the front door 2; a connecting part 12*b* which connects the elastic contact part 12*a* and the base part 11; and a bending part 12*c* formed in a part of the seal lip part 12 which is closer to a distal end of the seal lip part 12 than the elastic contact part 12*a* is.

The elastic contact part 12*a* constitutes a top portion of the seal lip part 12. The elastic contact part 12*a* is located closer to the inside of the vehicle and closer to the outside of the door than the turn center C and the attachment part 11*a* are. The elastic contact part 12*a* is located closer to the inside of the vehicle and closer to the outside of the door than the gap G is.

The connecting part 12*b* extends toward the inside of the vehicle from the end portion of the base part 11 which faces the outside of the door. The end portion of the connecting part 12*b* which faces the outside of the vehicle is diagonally joined to the end portion of the base part 11 which faces the outside of the door.

The bending part 12*c* bends in a direction (in the embodiment, a direction toward the inside of the door) in which the bending part 12*c* becomes father from the wheel arch flange part 42 as the bending part 12*c* becomes farther from the elastic contact part 12*a*.

The sealing part 13 is a part covering the end part 2*a* of the front door 2 which faces the outside of the door, and sealing the gap G. In its cross-sectional view, the sealing part 13 is formed in a plate shape. The sealing part 13 extends bending such that the sealing part 13 becomes closer to the inside of the door as the sealing part 13 becomes closer to the outside of the door from the end portion of the base part 11 which faces the outside of the door. The sealing part 13 is arranged extending across the end part 2*a* of the front door 2 which faces the outside of the door, toward the outside of the door and toward the outside of the vehicle. A base end portion of the sealing part 13 is diagonally joined to the end portion of the base part 11 which faces the outside of the door.

A distal end portion of the sealing part 13 is a free end. The thick part 13*a* which is thicker than a base end-side portion (a general part 13*b*) of the sealing part 13 is formed in the distal end portion of the sealing part 13. The thick part 13*a* is inserted into the gap G from the outside of the door, and passes through the gap G to stick out into the space S. The thick part 13*a* is formed such that the thick part 13*a* becomes continuously (smoothly and continuously) thicker toward the inside of the door. Incidentally, the thick part 13*a* may be formed such as the thick part 13*a* becomes thicker in steps (sharply) toward the inside of the door.

A root-side portion of the thick part 13*a* which is thinner than any other portion of the thick part 13*a* crushes in and thus closes the gap G. A thicker distal end-side portion of the thick part 13*a* which sticks out into the space S is away from the door lower design side part 31 toward the inside of the vehicle. The thick part 13*a* is located closer to the outside of the vehicle and closer to the outside of the door than the turn center C and the attachment part 11*a* are. A thickness dimension t4 of the thick part 13*a* is set at a thickness enough to always close the gap G when the door lower garnish 3 thermally elongates. The general part 13*b* of the sealing part 13, except for the thick part 13*a*, is formed such that its thickness dimension t3 is larger than the thickness dimension t2 of the seal lip part 12.

The thick part 13*a* diagonally inclines such that the thick part 13*a* becomes farther from the front door 2 as the thick part 13*a* becomes closer to its distal end from its root. A vehicle outside end part 13*c*, that is to say, a part of the thick part 13*a* which sticks out into the space S, is located closer to the outside of the vehicle than the end part 32*a* of the door lower flange part 32 which faces the inside of the vehicle is. Thereby, the door lower flange part 32 and the thick part 13*a* form part of the space S into a labyrinth in an even shape.

The automobile V including the door structure according to the embodiment of the present invention basically has the above-discussed configuration. Next, referring to FIG. 2, descriptions will be provided for how to attach the sealing member 1 and the door lower garnish 3 to the front door 2.

To begin with, the sealing member 1 is attached to the front door 2 such that the end part 2*a* of the front door 2 which faces the outside of the door is arranged between the base part 11 and the thick part 13*a*.

In this event, the base part 11 (the attachment part 11*a*) is attached to the door inner panel 21 using the clip 6.

Next, the door lower garnish 3 is attached to the front door 2 such that the root-side portion of the thick part 13*a* is arranged between the end part 2*a* of the front door 2 which faces the outside of the door and the end part 32*a* of the door lower flange part 32 which faces the inside of the vehicle, that is to say, such that the thick part 13*a* closes the gap G. Thereby, the sealing member 1 and the door lower garnish 3 are attached to the front door 2 with the gap G closed.

Figure 3:
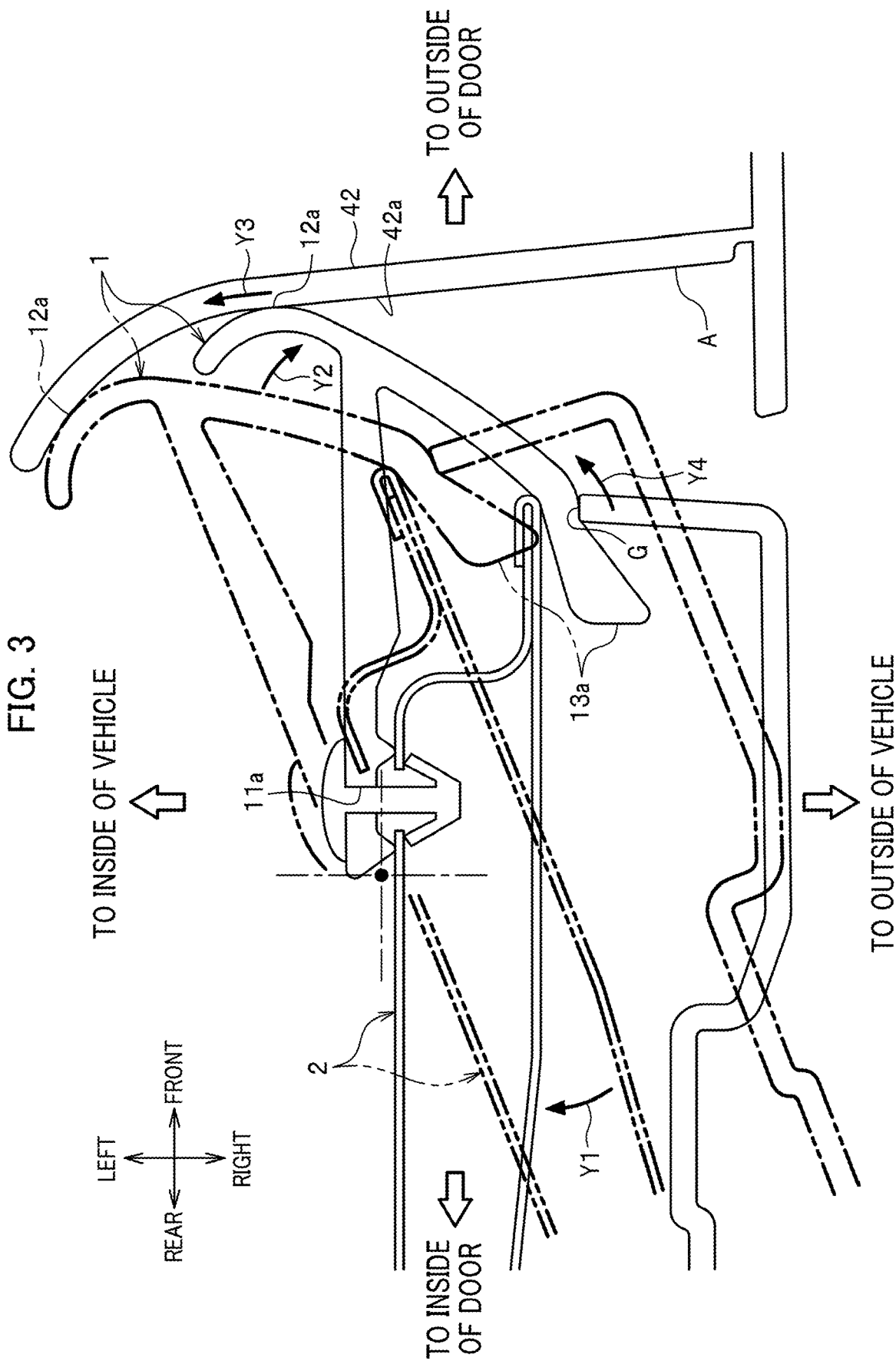
FIG. 3 is an explanatory diagram for explaining a force which works on a sealing member according to the embodiment.

Next, referring to FIG. 3, descriptions will be provided for a force which works on the sealing member 1 when the front door 2 gets closed.

As shown in FIG. 3, when the front door 2 in an opened state indicated with chain-double dashed lines gets closed to the door opening part A by being turned in a direction indicated with an arrow Y1, the sealing member 1 moves in a direction toward the outside of the vehicle (see an arrow Y2). During this movement, the elastic contact part 12*a* moves in the direction toward the outside of the vehicle (see the arrow Y2) while rubbing against the surface 42*a* of the wheel arch flange part 42 which faces the front door 2. This movement of the elastic contact part 12*a* makes frictional resistance in a direction toward the inside of the vehicle (see an arrow Y3) work on the elastic contact part 12*a*. Thus, when the front door 2 gets closed, the sealing member 1 is biased in the direction toward the inside of the vehicle (see the arrow Y3), and a force in a direction (see an arrow Y4) in which the thick part 13*a* is pulled out of the gap G always works on the thick part 13*a* around the attachment part 11*a*. The working of this force moves the thick part 13*a* toward the outside of the door, and thereby gets the thick part 13*a* caught in the gap G. Thus, the thick part 13*a* closes the gap G.

Figure 4B:
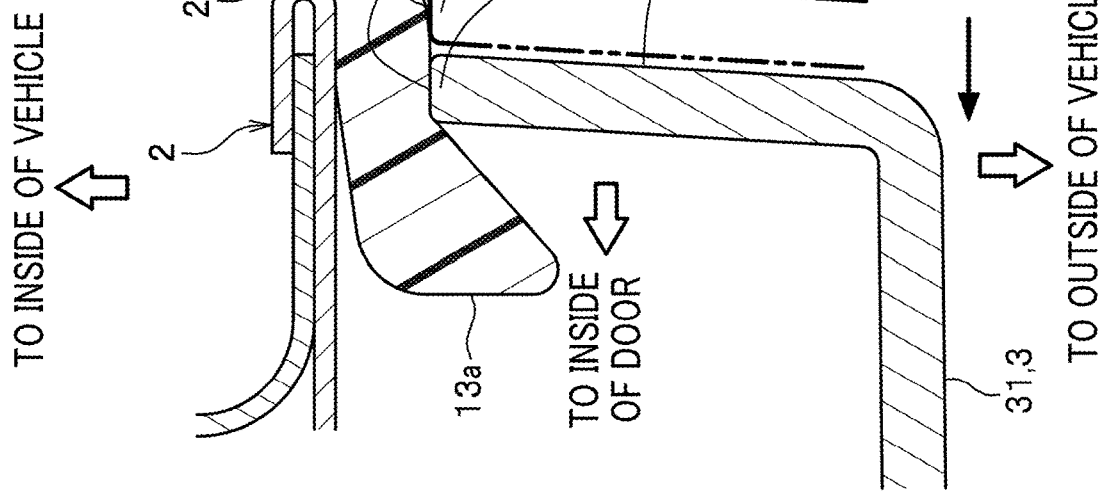
FIGS. 4A and 4B are cross-sectional diagrams for explaining how a thick part works when a door lower garnish changes its shape.
Figure 4A:
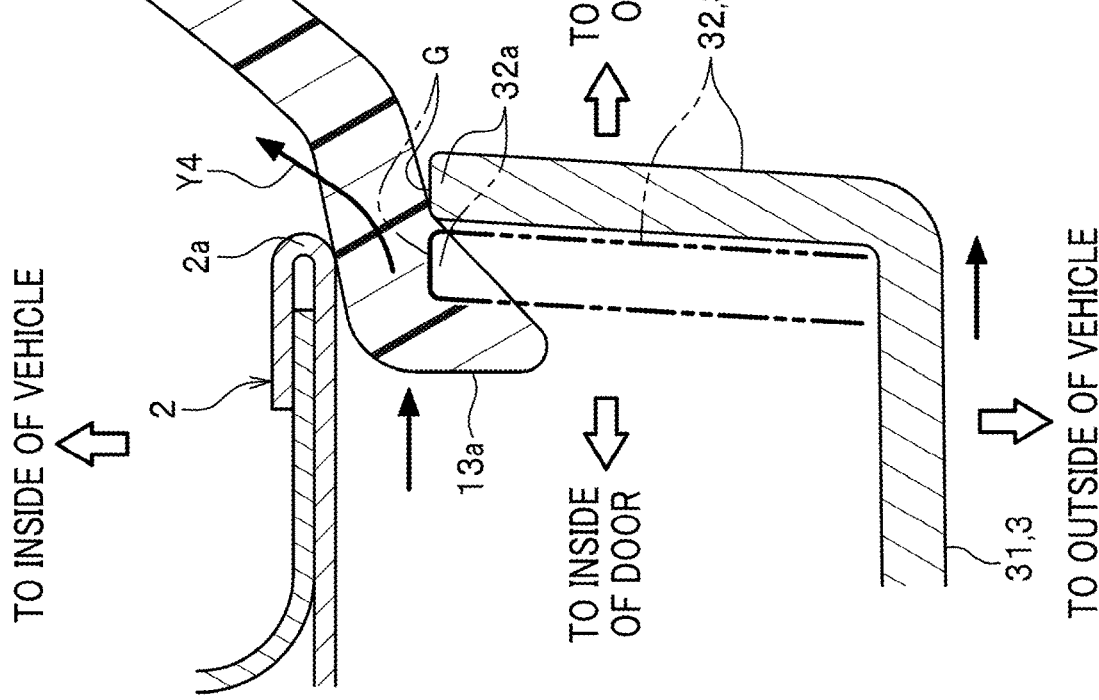

Next, referring to the FIGS. 4A and 4B, descriptions will be provided for how the thick part 13*a* works when the door lower garnish 3 changes its shape. Incidentally, in FIGS. 4A and 4B, a chain double-dashed line represents a normal position of the door lower flange part 32.

First of all, descriptions will be provided for how the thick part 13a works when the door lower garnish 3 thermally elongates.

As shown in FIG. 4A, while in the normal state (see the chain double-dashed line), the end part 32a of the door lower flange part 32 which faces the inside of the vehicle and the end part 2a of the front door 2 which faces the outside of the door are arranged in their respective positions which coincide with each other in the vehicle inside-outside direction.

When the door lower design side part 31 thermally elongates from the normal state toward the outside of the door (see a solid line), the end part 32a of the door lower flange part 32 which faces the inside of the vehicle shifts to a position which is away toward the outside of the door from the end part 2a of the front door 2 which faces the outside of the door. This results in an increase in the gap G between the end part 2a of the front door 2 which faces the outside of the door and the end part 32a of the door lower flange part 32 which faces the inside of the vehicle.

During this, the sealing member 1 is biased toward the inside of the vehicle, and the force in the direction (see the arrow Y4) in which the thick part 13a is pulled out of the gap G works on the thick part 13a around the attachment part 11a. The thick part 13a, therefore, moves toward the outside of the door by a distance corresponding to an increase in the gap G between the front door 2 and the door lower garnish 3 to close the thus-widened gap G. Thereby, the gap G can be preferably closed with the thick part 13a.

Next, descriptions will be provided for how the thick part 13a works when the door lower garnish 3 thermally contracts.

As shown in FIG. 4B, while in the normal state (see the chain double-dashed line), the end part 32a of the door lower flange part 32 which faces the inside of the vehicle and the end part 2a of the front door 2 which faces the outside of the door are arranged in their respective positions which coincide with each other in the vehicle inside-outside direction.

When the door lower design side part 31 thermally contracts from the normal state toward the inside of the door (see a solid line), the end part 32a of the door lower flange part 32 which faces the inside of the vehicle shifts to a position which is away toward the inside of the door from the end part 2a of the front door 2 which faces the outside of the door. This results in an increase in the gap G between the end part 2a of the front door 2 which faces the outside of the door and the end part 32a of the door lower flange part 32 which faces the inside of the vehicle.

During this, the movement of the door lower flange part 32 toward the inside of the door pushes the thick part 13a into the inside of the door. Thereby, the gap G can be preferably closed with the thick part 13a.

It should be noted that when the door lower design side part 31 thermally contracts toward the inside of the door from the thermally elongated state shown in FIG. 4A to return to the initial state indicated with the chain double-dashed line in FIG. 4A, the gap G between the end part 2a of the front door 2 which faces the outside of the door and the end part 32a of the door lower flange part 32 which faces the inside of the vehicle becomes narrower.

During this, the movement of the door lower flange part 32 toward the inside of the door pushes the thick part 13a into the inside of the door. Thereby, the gap G can be preferably closed with the thick part 13a.

In the above-discussed embodiment, since the sealing member 1 is biased in the direction toward the inside of the vehicle, the force in the direction in which the thick part 13a is pulled out of the gap G works on the thick part 13a. Once, therefore, the thermal elongation of the door lower garnish 3, which is the decorative member, widens the gap G between the front door 2 and the door lower garnish 3, the thick part 13a moves toward the outside of the door. During the movement, the gap G widened by the thick part 13a can be preferably closed with the thick part 13a since the thick part 13a becomes thicker toward the inside of the door. This makes it possible to prevent the gap G from causing wind noise, and makes a different structure or part for preventing the occurrence of the wind noise no longer necessary.

In the embodiment, since the thick part 13a becomes continuously thicker toward the inside of the door, the thick part 13a is gradually forced into the gap G when the door lower garnish 3 thermally elongates, whereas the thick part 13a is gradually pushed into the inside of the door when the door lower garnish 3 thermally contracts to return the initial state. For this reason, no sudden large load is applied to the thick part 13a, and the deformation of the thick part 13a can be inhibited.

In the embodiment, the elastic contact part 12a is located closer to the inside of the vehicle and closer to the outside of the door than the attachment part 11a is, and the gap G is located closer to the outside of the vehicle than the attachment part 11a is. For this reason, when the front door 2 gets closed, the elastic contact part 12a moves in the direction toward the outside of the vehicle while rubbing against the wheel arch flange part 42, which is a part of the vehicle body. Thus, the frictional resistance in the direction toward the inside of the vehicle works on the elastic contact part 12a, and the force in the direction in which the thick part 13a is pulled out of the gap G works on the thick part 13a around the attachment part 11a. The thick part 13a, therefore, moves toward the outside of the door to be forced into the gap G. Thereby, the gap G can be preferably closed with the thick part 13a. This makes it possible to prevent the gap G from causing wind noise, and makes a different structure or part for preventing the occurrence of the wind noise no longer necessary.

In the embodiment, since the elastic contact part 12a is located closer to the inside of the vehicle than the turn center C of the front door 2 is, the seal lip part 12 never turns over toward the outside of the vehicle (bends back toward the outside of the vehicle) when the front door 2 gets opened and closed. This makes it possible to stabilize the force which works on the thick part 13a around the attachment part 11a, and to enhance the function of closing the gap G.

In the embodiment, since the sealing member 1 includes the plate-shaped part 11b which connects the attachment part 11a and the thick part 13a, the rigidity of the attachment part 11a and the thick part 13a is enhanced. This makes it possible to securely transmit the force, which works on the thick part 13a around the attachment part 11a, to the thick part 13a, and to enhance the function of closing the gap G.

Furthermore, in the embodiment, since the plate-shaped part 11b enhances the rigidity of the attachment part 11a and the thick part 13a, the thickness of the sealing member 1 as a whole can be reduced to the minimum requirement.

A configuration in which the thick part 13a is in contact with the door lower design side part 31 involves a risk that when the thick part 13a thermally expands to press the door lower design side part 31 toward the outside of the vehicle, the gap G between the front door 2 and the door lower garnish 3 becomes wider.

In contrast to this, the embodiment can eliminate the risk and can prevent the gap G from causing wind noise, since the thick part 13*a* is away toward the inside of the vehicle from the door lower design side part 31 which is the design side part.

In the embodiment, the door lower flange part 32 and the thick part 13*a* form part of the space S into the labyrinth in an even shape, and this labyrinth plays a high sealing performance. For this reason, if air passes through the gap G, the labyrinth can inhibit the air from entering the depth of the space S.

In the embodiment, the seal lip part 12 includes the bending part 12*c* formed in the distal end of the seal lip part 12 than the elastic contact part 12*a* is, and the bending part 12*c* bends in the direction in which the bending part 12*c* becomes father from the wheel arch flange part 42 as the bending part 12*c* becomes farther from the elastic contact part 12*a*. For this reason, the seal lip part 12 never turns over toward the outside of the vehicle (bends back toward the outside of the vehicle) when the front door 2 gets opened and closed. This makes it possible to stabilize the force which works on the thick part 13*a* around the attachment part 11*a*, and to enhance the function of closing the gap G.

Although referring to the drawings, the foregoing detailed descriptions have been provided for the embodiment of the present invention, the present invention is not limited to this embodiment, and may be modified as appropriate within the scope not departing from the gist or spirit of the invention.

Although in the embodiment, the door structure according to the present invention is applied to the front door 2, the door structure may be applied to a rear side door.

Although the embodiment has shown the door lower garnish 3 as an example of the decorative member of the present invention, the present invention is not limited to the door lower garnish 3, and a light mall or the like may be used as the decorative member.

Although the embodiment employs the configuration in which the thick part 13*a* is away toward the inside of the vehicle from the door lower design side part 31, a configuration in which the thick part 13*a* is in contact with the door lower design side part 31 may be employed.

The sealing member 1 is not limited to having the shape shown in the embodiment. The shape of the sealing member 1 may be changed, for example, to a shape shown in FIG. 5. The sealing member 1 shown in FIG. 5 is different from the sealing member 1 of the embodiment in terms of the direction of the extension of the seal lip part 12. Descriptions will be provided mainly for what makes the sealing member 1 shown in FIG. 5 different from the sealing member 1 of the embodiment. The seal lip part 12 of the modification extends toward the outside of the vehicle from the end portion of the base part 11 which faces the outside of the door, and thereafter extends bending toward the inside of the door. The seal lip part 12 is located closer to the outside of the door than the sealing part 13 is.

The elastic contact part 12*a* is located closer to the outside of the vehicle and closer to the outside of the door than the turn center C and the attachment part 11*a* are. The connecting part 12*b* extends toward the outside of the vehicle from the end portion of the base part 11 which faces the outside of the door. The end portion of the connecting part 12*b* which faces the outside of the vehicle is diagonally joined to the end portion of the base part 11 which faces the outside of the door.

REFERENCE SIGNS LIST

V automobile (door structure)
1 sealing member
11 base part
11*a* attachment part
11*b* plate-shaped part
12 seal lip part
12*a* elastic contact part
13 sealing part
13*a* thick part
2 front door (door)
2*a* end part facing outside of door
2*b* surface facing outside of vehicle
3 door lower garnish (decorative member)
31 door lower design side part (design side part)
32 door lower flange part (end part of decorative member which faces outside of door)
4 wheel arch garnish (vehicle body)
B vehicle body
A door opening part
G gap
C turn center

The invention claimed is:

1. A door structure comprising:
   a door installed capable of opening and closing a door opening part of a vehicle body;
   a decorative member attached to a surface of the door which faces an outside of a vehicle;
   a sealing member arranged along an end part of the door which faces an outside of the door, and sealing the door opening part,
   wherein
   the sealing member includes:
      a base part which extends in a front-rear direction and in an upper-lower direction;
      a seal lip part which extends from an end portion of the base part which faces the outside of the door, and is formed in an arc shape which curves convexly toward the outside of the door, the seal lip part including an elastic contact part which gets into elastic contact with the vehicle body;
      a sealing part which extends toward the outside of the vehicle from the end portion of the base part which faces the outside of the door; and
      an attachment part attached to the door, the attachment part formed in a position on the base part near an inside of the door,
   the sealing part includes a thick part which becomes thicker toward the inside of the door, and which is inserted into a gap formed between the end part of the door which faces the outside of the door and an end part of the decorative member which faces the outside of the door,
   the sealing member is biased toward an inside of the vehicle,
   the door is installed turnable to and away from the vehicle body, and
   the elastic contact part is closer to the outside of the door than a turn center of the door.

2. The door structure according to claim 1, wherein the thick part becomes continuously thicker toward the inside of the door.

3. The door structure according to claim 1, wherein the elastic contact part is located closer to the inside of the vehicle and closer to the outside of the door than the attachment part, and
   the gap is located closer to the outside of the vehicle than the attachment part is.

4. The door structure according to claim 3, wherein the elastic contact part is located closer to the inside of the vehicle than a turn center of the door is.

5. The door structure according to claim 3, wherein the sealing member includes a planar part which connects the attachment part and the thick part.

6. The door structure according to claim 1, wherein the decorative member includes a design side part which crosses the end part, forming the gap, of the decorative member which faces the outside of the door, and which constitutes an outer surface of the decorative member, and the thick part is inserted into the gap, and a distal end of the thick part is spaced from the design side part.

* * * * *